(12) United States Patent
Janakiraman et al.

(10) Patent No.: US 9,159,044 B2
(45) Date of Patent: Oct. 13, 2015

(54) NOTIFICATION SYSTEM BASED ON INTELLIGENT MAIL BARCODES

(71) Applicant: International Business Machines Corporation, Armonk, NY (US)

(72) Inventors: Janani Janakiraman, Austin, TX (US); Dany R. Madden, Beaverton, OR (US); Meenakshi Sripal, Saint Louis, MO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/078,409

(22) Filed: Nov. 12, 2013

(65) Prior Publication Data
US 2015/0129654 A1    May 14, 2015

(51) Int. Cl.
*G06F 17/00*    (2006.01)
*G06Q 10/08*    (2012.01)

(52) U.S. Cl.
CPC .................................. *G06Q 10/083* (2013.01)

(58) Field of Classification Search
USPC .................. 235/375, 462.01, 462.02, 462.09; 382/101
See application file for complete search history.

(56) References Cited

U.S. PATENT DOCUMENTS

| 7,953,607 | B2* | 5/2011 | McNairy ......................... 705/1.1 |
| 2006/0143033 | A1* | 6/2006 | Foth et al. ........................ 705/1 |
| 2012/0089532 | A1* | 4/2012 | Kuebert et al. ............... 705/330 |
| 2012/0179606 | A1 | 7/2012 | Sagi et al. |
| 2014/0189018 | A1* | 7/2014 | Nawaz et al. ................. 709/206 |

FOREIGN PATENT DOCUMENTS

WO    2006071422 A2    7/2006

OTHER PUBLICATIONS

"IMB is here! Intelligent Mail Barcode—What Mailers need to know," Compact Information Systems, Jan. 4, 2013, 3 pages.
"Implementing the Intelligent Mail Barcode," Pitney Bowes, Intelligent Mail White Paper, Feb. 23, 2008, 8 pages.

* cited by examiner

*Primary Examiner* — Ahshik Kim
(74) *Attorney, Agent, or Firm* — VanLeeuwen & VanLeeuwen; Damion C. Josephs (57) ABSTRACT

An approach is provided to notify an addressee of postal mail. The approach is performed by reading an enhanced mail barcode affixed to the postal mail. The enhanced mail barcode identifies a contents of the postal mail. The approach further retrieves an electronic contact address that corresponds to the addressee of the postal mail. Finally, the approach transmits an electronic notification, such as an email, text message, voice message, etc. to the retrieved electronic contact address that corresponds to the addressee.

17 Claims, 8 Drawing Sheets

NOTIFICATION SYSTEM BASED ON INTELLIGENT MAIL BARCODES

BACKGROUND OF THE INVENTION

Intelligent Mail (IM) is a 65-bar code used on mail delivered by the United States postal service. "INTELLIGENT MAIL®," "IM®," and "IMB®" are registered trademarks of the United States Postal Service. IM includes the following components: barcode identifier, service/mailing type identifier, mailer ID, sequence number and delivery point postal code (e.g., ZIP code, etc.). One reason mailers implement IMB barcodes is to qualify for automation prices offered by the postal service. The Intelligent Mail barcode is a height-modulated barcode that encodes up to 31 decimal digits of mail-piece data into 65 vertical bars. The code is made up of four distinct symbols. Each bar contains the central "tracker" portion, and may contain an ascender, descender, neither, or both (a "full bar"). The 65 bars represent 130 bits (or 39.13 decimal digits), grouped as ten 13-bit characters. Each character has 2, 5, 8, or 11 of its 13 bits set to one. The Hamming distance between characters is at least 2. Consequently, single-bit errors in a character can be detected (adding or deleting one bit results in an invalid character). The characters are interleaved throughout the symbol. The Postal Service's IM carries a data payload of 31 digits representing elements including a barcode identifier, a service type identifier, a mailer identifier, a sequence number, and a delivery point ZIP code.

SUMMARY

An approach is provided to notify an addressee of postal mail. The approach is performed by reading an enhanced mail barcode affixed to the postal mail. The enhanced mail barcode identifies the contents of the postal mail. The approach further retrieves an electronic contact address that corresponds to the addressee of the postal mail. Finally, the approach transmits an electronic notification, such as an email, text message, voice message, etc. to the retrieved electronic contact address that corresponds to the addressee.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
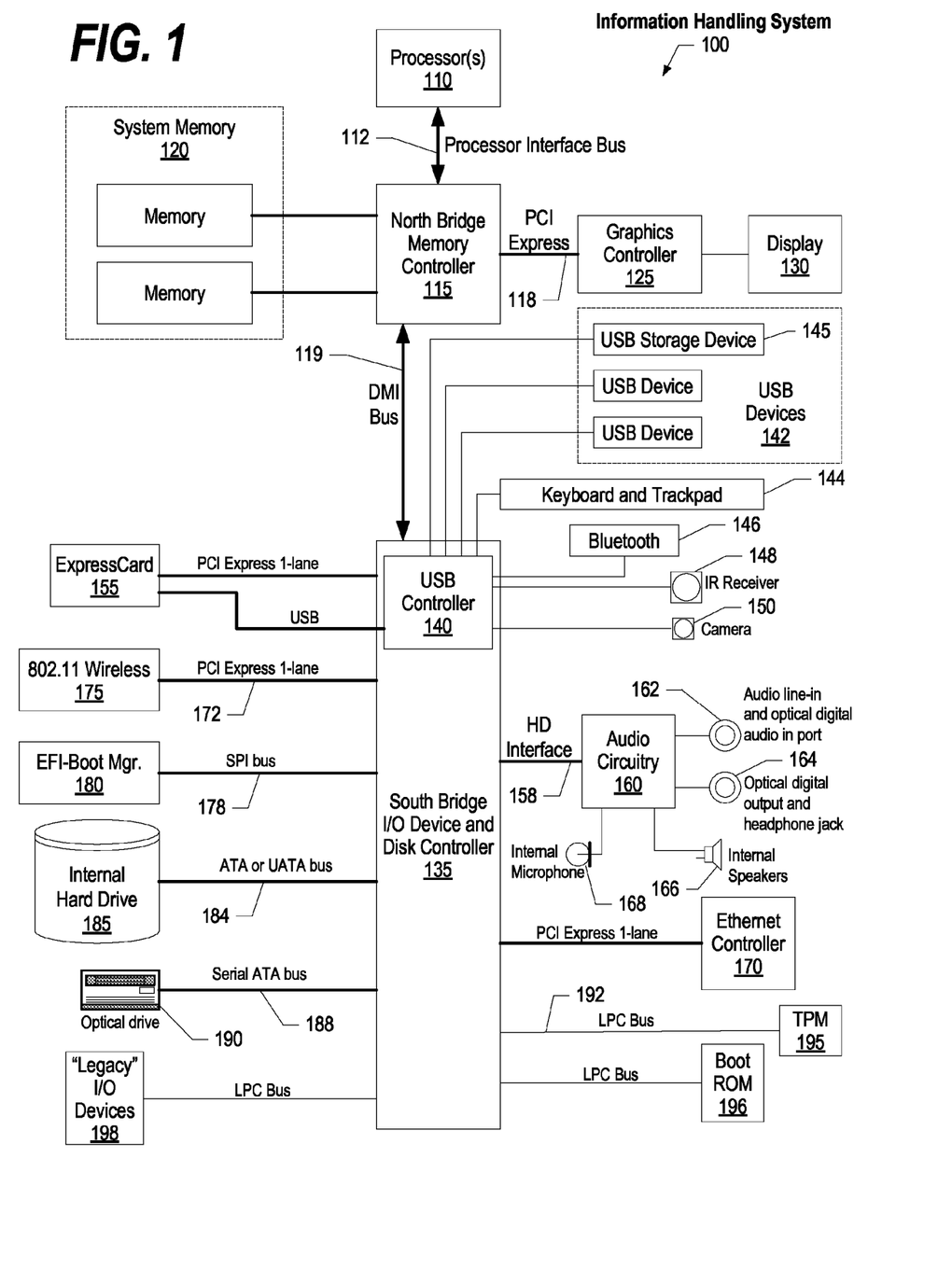
FIG. 1 is a block diagram of a data processing system in which the methods described herein can be implemented.
Figure 2:
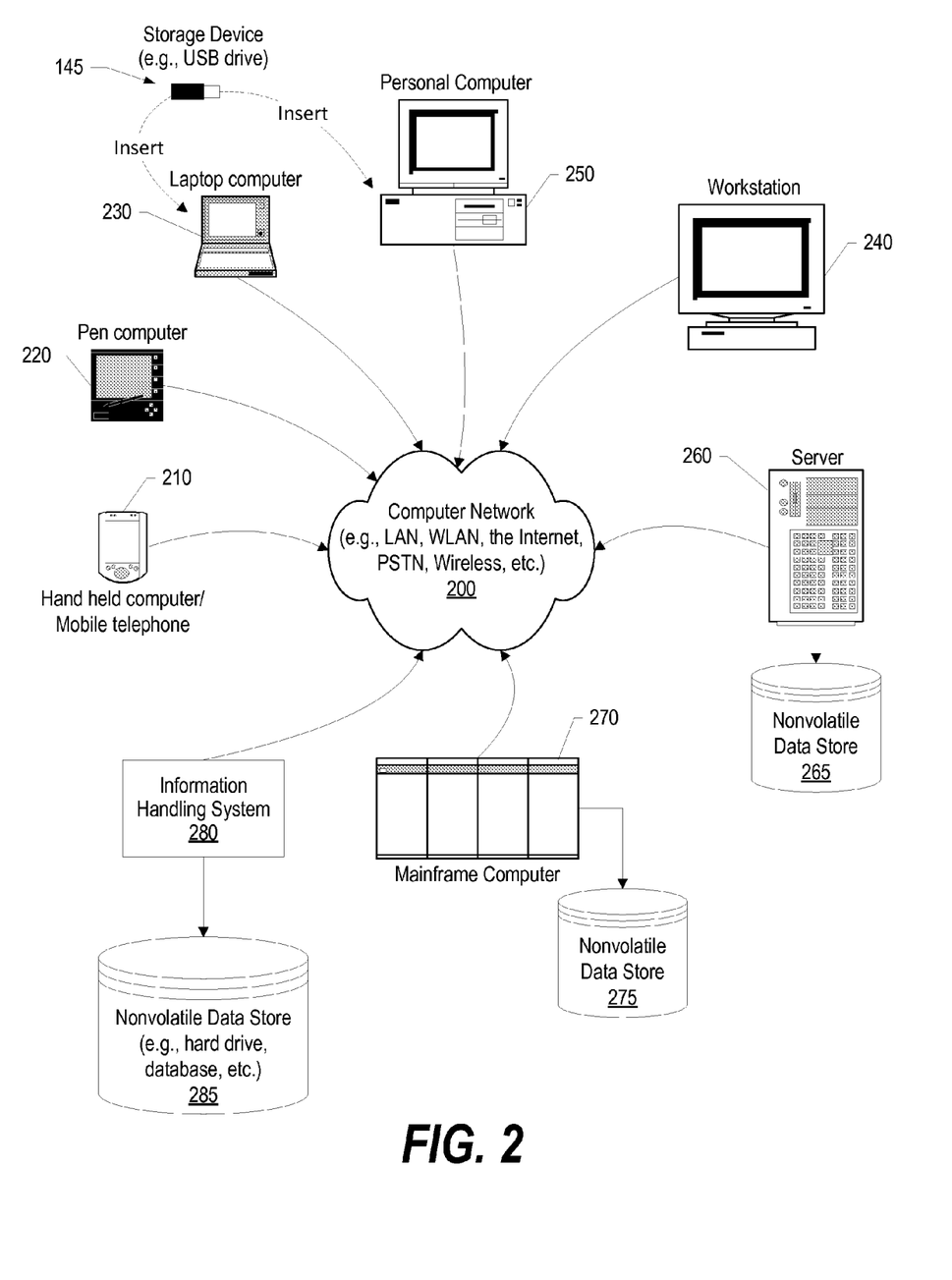
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera)

150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8 depict an approach that can be executed on an information handling system and computer network as shown in FIGS. 1-2. In one embodiment, users subscribe to a mail notification service that reads enhanced barcodes (eMBs) affixed to postal mail and uses the information encoded in the eMBs to electronically notify the user regarding the contents of the postal mail. For example, if the postal mail is an invoice with a due date, the mail notification service can be used to send an electronic reminder that the invoice is due, such as a week before the due date. In this manner, if the user has misplaced the paper invoice or has forgotten about it, the electronic reminder, such as a text message sent to the user's mobile telephone, will remind the user that the invoice is due so that the user can pay the invoice without incurring a penalty or interest charges. Likewise, the postal mail might be a valuable coupon with a particular due date. In this case, the mail notification service can remind the user that the coupon was sent and allow the user time to retrieve the coupon and use it at the merchant's store. In addition, multiple reminders and electronic contact addresses can be configured by the user so that the mail notification service sends electronic notices to multiple electronic contact addresses (e.g., an email account, a mobile telephone, etc.) at different times (e.g., one week before the due date or expiration date, three days before the due date or expiration date, etc.). The eMB can be encoded with information such as an identification of the contents of the postal mail (e.g., an invoice, a coupon, etc.), the sender (e.g., a merchant name, a service or company name, etc.), as well as any date information that pertains to the contents (e.g., due date, coupon expiration date, etc.).

Figure 3:
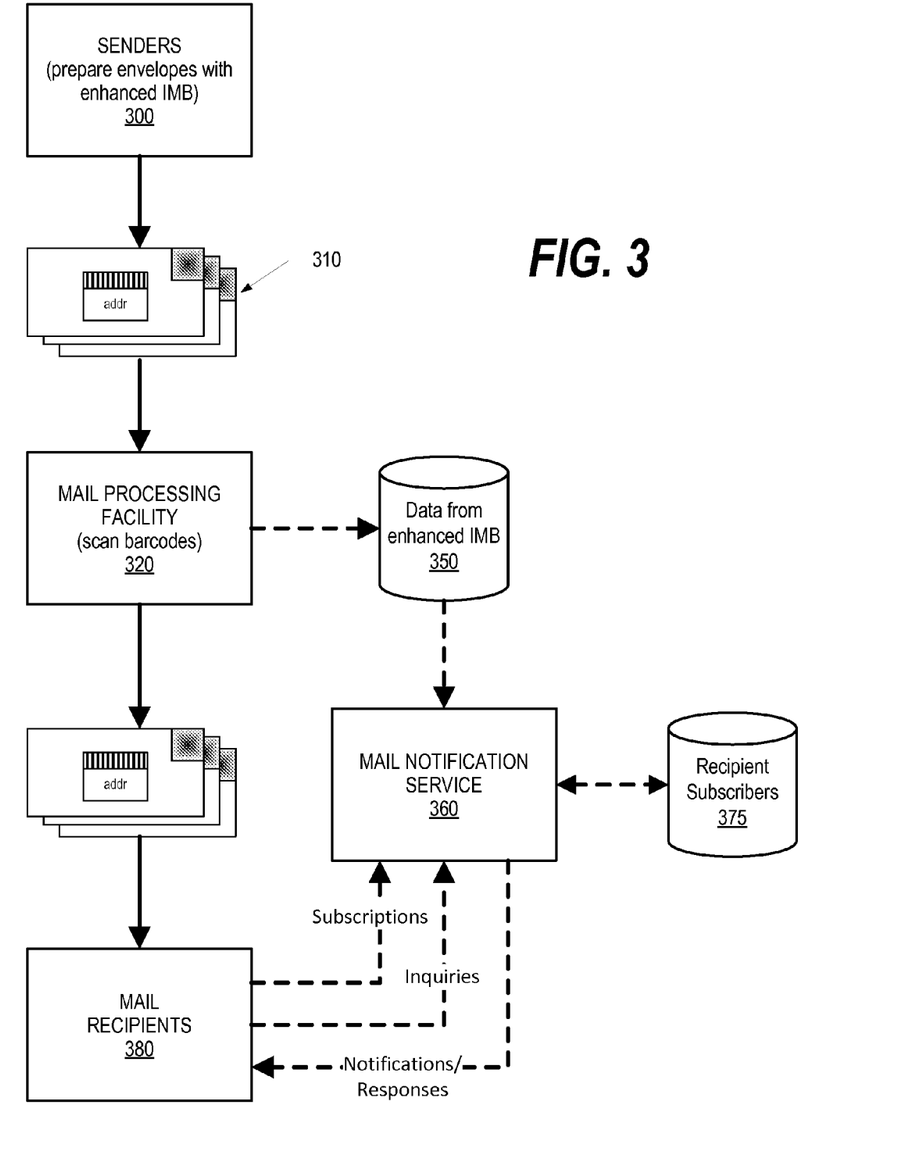
FIG. 3 is a diagram showing components involved in providing notifications based on enhanced mail barcodes (eMBs)

FIG. 3 is a diagram showing components involved in providing notifications based on enhanced mail barcodes (eMBs). Senders 300, such as businesses, organizations, or the like. Senders 300 prepare mailings with contents such as invoices, coupons, or the like. The mailings include eMBs that are affixed to the mailing, such as to the envelope in which the mailing is enclosed or on a postcard if the mailing is a postcard. The eMB is an enhanced MB in that it includes encoded information regarding the contents of the mailing. Such content-related encoded data might include whether the mailing is an invoice, coupon, or other type of mailing. The eMB data might also include time-related information, such as a payment due date for an invoice or an expiration date pertaining to an enclosed coupon. Further, the eMB data might identify the sender of the mailing which could be included in either the Intelligent Mail barcode (IMB) portion of the barcode or in the enhanced portion of the barcode. Mailings 310 are affixed with the eMB as well as with the addressee information for the mail recipient (e.g., recipient name, address, postal code, etc.).

Mail processing facility 320 is a facility that processes physical mail on behalf of the intended recipients. The mail processing facility may process the mail before its delivery to the postal service, as an integrated process within the postal service, or upon delivery to a recipient location. As shown, mail processing facility 320 scans the eMBs affixed to the physical mail intended for various recipients. In addition, the eMB can scan the addressee data (recipient name, address, etc.). The scanned data is stored in data store 350. The physical mail is delivered to mail recipients 380.

Mail notification service 360 provides a notification service for mail recipients based upon the data gathered by the mail processing facility and stored in data store 350. In one embodiment, mail recipients subscribe with mail notification service 360 to receive various notifications regarding mailings that have been sent to the mail recipients. This subscriber data is stored in data store 375. Subscriber data may further include subscriber preferences, such as frequency and timing of reminders that should be transmitted to the subscriber based upon the type of mailing. For example, the subscriber may want to be reminded two weeks before an invoice is due and then again one week before the invoice is due, but only notified once one month before a coupon is set to expire. In one embodiment, mail recipients 380 that have subscribed with mail notification service 360 can send inquiries regarding a particular mailing, such as to inquire when, or if, a particular invoice was mailed to the recipient. Such inquiries may be helpful in identifying mailing that were lost or delivered to an incorrect address. Mail notification service 360 transmits electronic notifications to electronic contact addresses (e.g., email addresses, mobile telephone numbers, etc.) that were provided by individual mail recipients 380. In addition, mail notification service 360 transmits responses to inquiries received from mail recipients 380.

Figure 4:
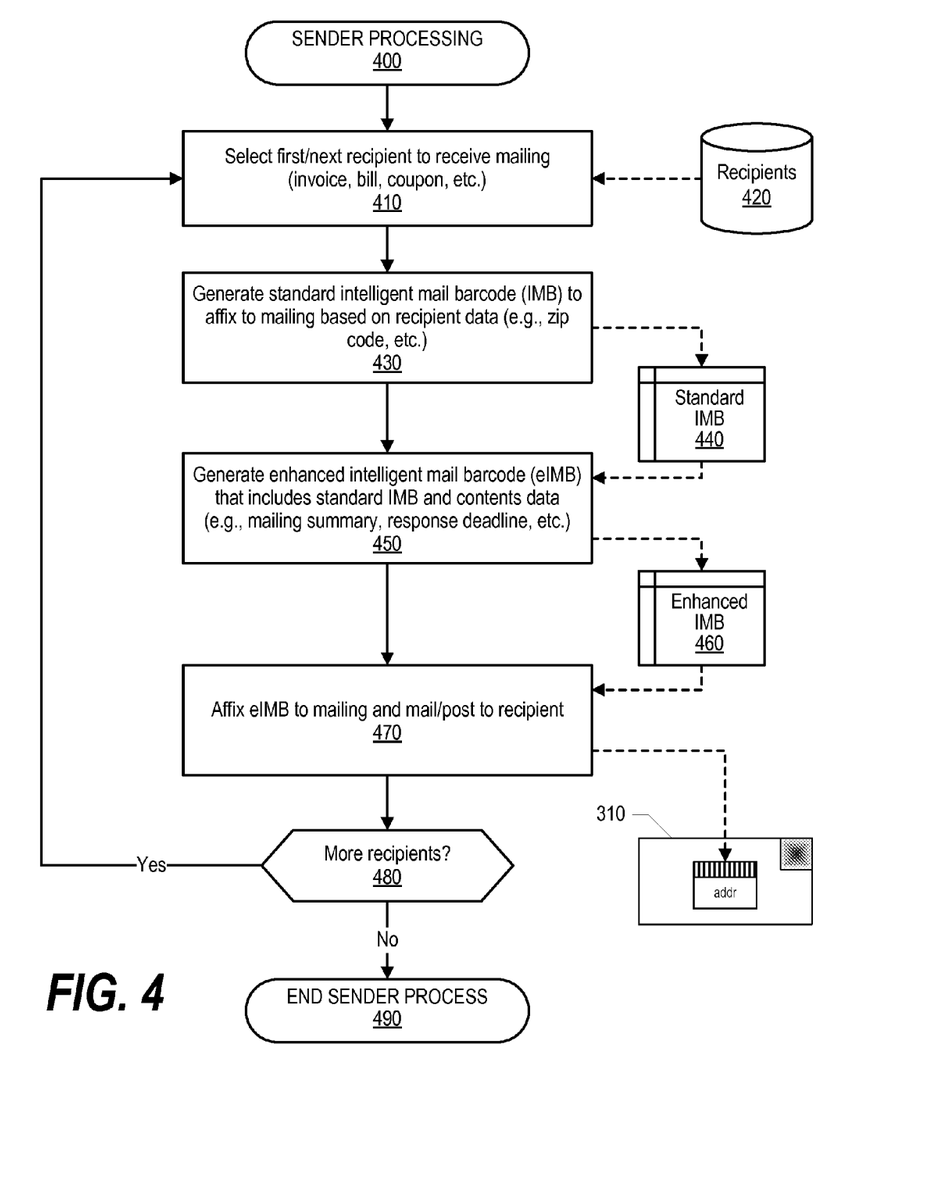
FIG. 4 is a flowchart showing steps performed during sender processing of mail that provides notifications based on enhanced mail barcodes.

FIG. 4 is a flowchart showing steps performed during sender processing of mail that provides notifications based on enhanced mail barcodes (eMBs). Sender processing commences at 400 whereupon, at step 410, the sender selects the first recipient to receive its mailing (e.g., an invoice, bill, coupon, etc.). Recipient data is retrieved from recipients data store 420, such as a customer list or the like, and includes the recipients' mailing address.

At step 430, the sender process generates an Intelligent Mail barcode (IMB) to affix to the mailing. The Intelligent Mail barcode includes recipient data such as the recipient's zip code, etc. The generated IMB is stored in memory area 440. At step 450, the sender process generates an enhanced mail barcode (eMB) that includes both the IMB from memory area 440 as well as encoded information that provides content information pertaining to the contents of the mailing being sent to the recipient. This content information can include a mailing type (e.g., invoice, coupon, etc.) as well as other content information, such as a due date for an invoice, an expiration date pertaining to a coupon, and the like. In addition, the eMB can include a sender identification that identifies a merchant, business, organization, or the like that is sending the mailing. The eMB is stored in memory area 460. At step 470, the eMB that was generated for the recipient is affixed to mailing 310 along with the recipient address information, and the completed mailing is mailed to the recipient via the postal service.

A determination is made as to whether there are more recipients to process (decision 480). If there are more recipients to process, then decision 480 branches to the "yes" branch which loops back to select the next recipient from data store 420 and generate the eMB for the newly selected recipient as described above. This looping continues until there are no more recipients to process, at which point decision 480 branches to the "no" branch whereupon sender processing ends at 490.

Figure 5:
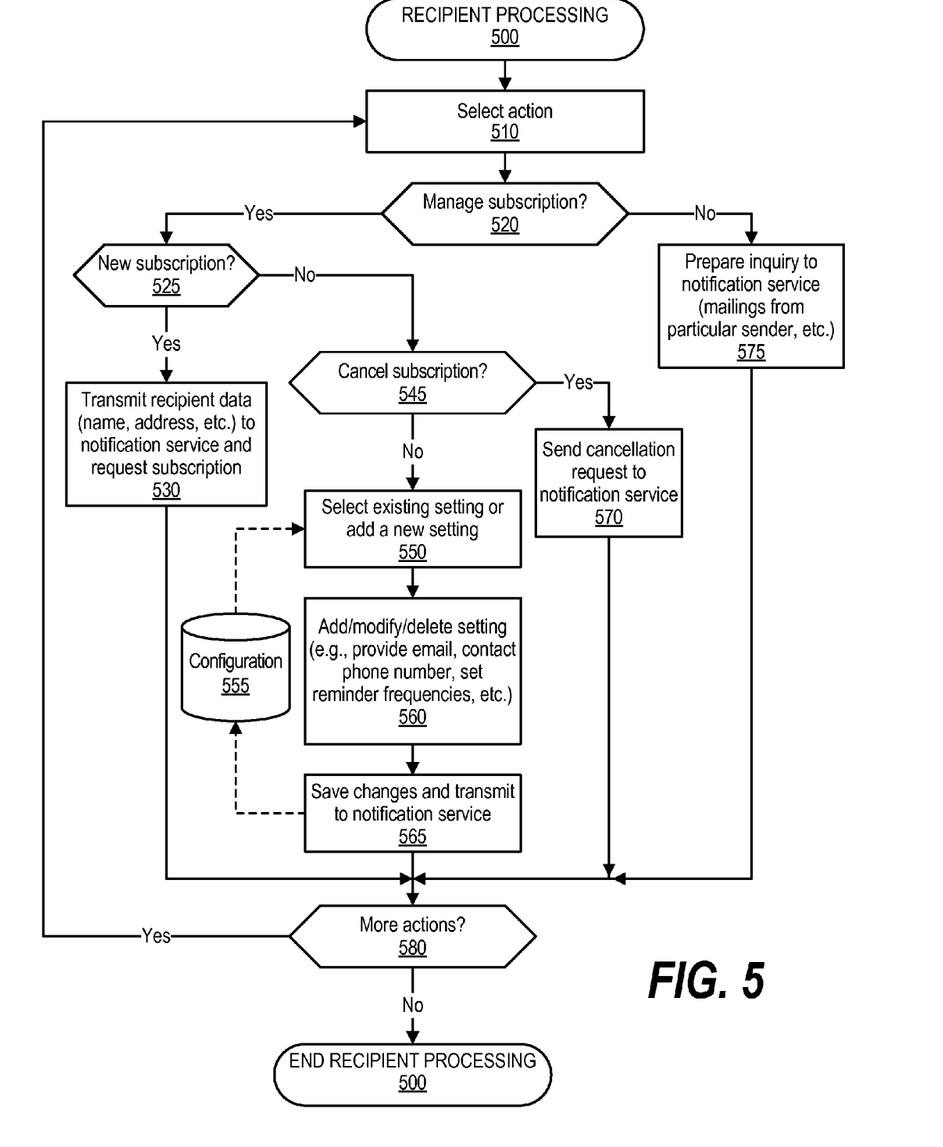
FIG. 5 is a flowchart showing steps performed during recipient processing of mail that provides notifications based on enhanced mail barcodes.

FIG. 5 is a flowchart showing steps performed during recipient processing of mail that provides notifications based on enhanced mail barcodes (eMBs). Recipient processing commences at 500 whereupon, at step 510, an action is selected by the user, such as by using a graphical user interface (GUI) provided by a mail notification service's website.

A determination is made as to whether the user's selected action is to manage the recipient's subscription to the mail notification service (decision 520). If the user's selection is to manage the user's subscription with the mail notification service, then decision 520 branches to the "yes" branch to process the subscription management request. A determination is made as to whether the user is requesting a new subscription to the mail notification service (decision 525). If the user is requesting a new subscription to the mail notification service, then decision 525 branches to the "yes" branch whereupon, at step 530, the user provides the recipient subscriber data, such as the recipient's name, address, etc., to the mail notification service and requests a subscription to the mail notification service. In addition, the user provides at least one electronic contact address, such as an email address or mobile telephone number, to which notifications should be transmitted by the mail notification service. Initially, the subscription may provide notifications based on default parameters regarding the timing and frequency of various types of mailings, however the user can manage the subscription and provide preferences regarding how various types of mailings should be handled.

Returning to decision 525, if the user is already subscribed and is not requesting a new subscription to the mail notification service, then decision 525 branches to the "no" branch for further processing. A determination is made as to whether the user is requesting to cancel the subscription to the mail notification service (decision 545). If the user is not requesting cancellation of the subscription, then decision 545 branches to the "no" branch to process the user's preferences pertaining to the mail notification service.

At step 550, the user selects an existing setting (preference) or requests to add a new setting (preference). Currently established preferences are retrieved from data store 555. At step 560, the user can add, modify, or delete a setting. Such actions can include adding/modifying/deleting electronic contact addresses that correspond to the addressee of the postal mail, setting reminder preferences regarding the timing and frequency for various types of mail, etc. At step 565, the preferences selected by the user are stored in configuration data store 555 for use by the mail notification service.

Returning to decision 545, if the user is requesting cancellation of the mail notification service, for example because of a move to a different mailing location, etc., then decision 545 branches to the "yes" branch whereupon, at step 570, a cancellation request is transmitted to the mail notification service. Returning to decision 520, if the request received from the recipient is not to manage the user's subscription to the mail notification service, then decision 520 branches to the "no" branch whereupon, at step 575, the user can prepare an inquiry to the mail notification service (e.g., mailings from a particular sender, upcoming due dates, etc.).

After the user action has been processed, a determination is made as to whether the user has more actions to process (decision 580). If the user has more actions to process, then decision 580 branches to the "yes" branch which loops back to receive the next user action and process the next action as described above. This looping continues until the user has no more actions to process, at which time decision 580 branches to the "no" branch and recipient processing ends at 595.

Figure 6:
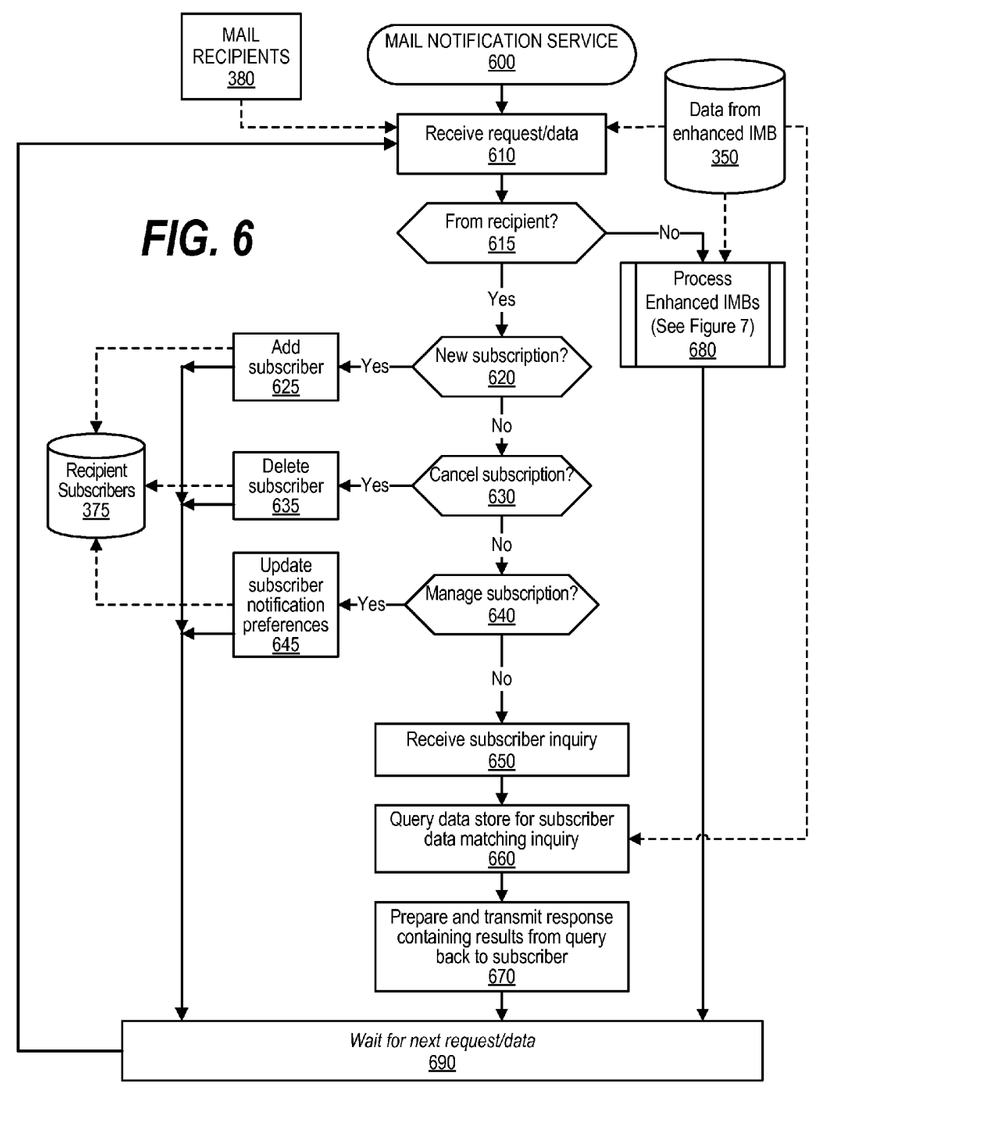
FIG. 6 is a flowchart showing steps performed by a mail notification service that provides notifications based on enhanced mail barcodes.

FIG. 6 is a flowchart showing steps performed by a mail notification service that provides notifications based on enhanced mail barcodes (eMBs). Mail notification service processing commences at 600 whereupon, at step 610, the mail notification service receives a request and associated data from mail recipient 380. The mail notification service also retrieves data from data store 350. This data was previously collected when the enhanced MB was scanned by the mail processing facility. The mail notification service determines whether the request was received from a recipient (decision 615). If the request was received from a recipient (subscriber), then decision 615 branches to the "yes" branch to process the recipient's request. On the other hand, if the request was not received from a recipient, then decision 615 branches to the "no" branch whereupon, at predefined process 680, the mail notification service processes the enhanced MBs stored in data store 350 to notify the various recipients (see FIG. 7 and corresponding text for further processing details).

Returning to recipient request processing, the mail notification service makes a determination as to whether the request is for a new subscription (decision 620). If the request is for a new subscription, then decision 620 branches to the "yes" branch whereupon, at step 625, the new subscriber data is added to recipient subscribers data store 375. On the other hand, if the request was not for a new subscription, then decision 620 branches to the "no" branch.

The mail notification service makes a determination as to whether the request is to cancel a recipient's subscription (decision 630). If the request is to cancel a subscription, then decision 630 branches to the "yes" branch whereupon, at step 635, the subscriber data is deleted from recipient subscribers data store 375. On the other hand, if the request was not to cancel a subscription, then decision 630 branches to the "no" branch.

The mail notification service makes a determination as to whether the request is to modify a recipient's subscription (decision 640). If the request is to modify a recipient's subscription, then decision 640 branches to the "yes" branch whereupon, at step 645, the subscriber's preferences are used to update the recipient's preference data and is stored in recipient subscribers data store 375. On the other hand, if the request was not to modify a subscription, then decision 640 branches to the "no" branch to process a subscriber inquiry.

At step 650, the mail notification service receives the subscriber's inquiry that was included in the recipient's request. At step 660, the mail notification service uses the inquiry data to query data store 350 for data matching the subscriber's inquiry and data matching the subscriber's query is returned to the mail notification service process. At step 670, the mail notification service prepares and transmits a response to the subscriber with the results from the query.

At step 690, after the subscriber's request has been processed, the mail notification service waits for the next request to be received from a subscriber or for new data to be detected in data store 350. When a request/data arrives, the process loops back to step 610 to process the request/data as described above.

Figure 7:
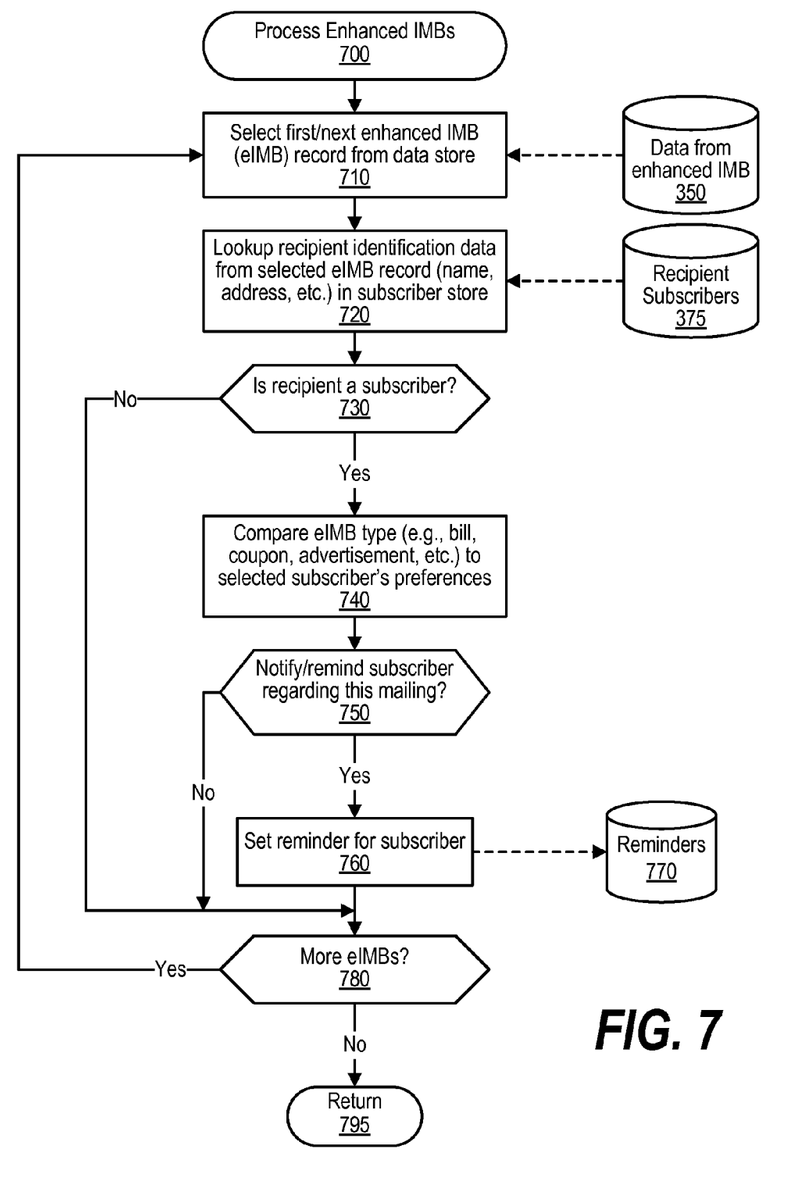
FIG. 7 is a flowchart showing steps performed to process enhanced mail barcodes.

FIG. 7 is a flowchart showing steps performed to process enhanced mail barcodes (eMBs). Processing commences at 700 whereupon, at step 710, the process selects the first eMB data record from data store 350. At step 720, the process performs a lookup on the recipient (addressee) data from the data record retrieved from data store 350 by looking for the data in recipient subscribers data store 375.

A determination is made as to whether the recipient of the mail is a subscriber of the mail notification service (decision 730). If the recipient of the mail is a subscriber, then decision 730 branches to the "yes" branch whereupon, at step 740, the mail type is identified based on the eMB (e.g., invoice, coupon, etc.) and this type is compared to one or more mail category selections that may have been provided by the recipient when the recipient was configuring various notification preferences. The process makes a determination, based on the comparison, of whether to set a reminder for the recipient based on the type of mailing (decision 750). If a reminder should be set for this type of mailing, then decision 750 branches to the "yes" branch whereupon, at step 760, one or more reminders are set and stored in reminders data store 770. On the other hand, if a reminder should not be set for this type of mailing, then decision 750 branches to the "no" branch bypassing step 760.

A determination is made as to whether there are more eMBs to process from data store 350 (decision 780). If there are more eMB records to process, then decision 780 branches to the "yes" branch which loops back to select and process the next eMB record as described above. This looping continues until all of the eMB records in data store 350 have been processed, at which point decision 780 branches to the "no" branch and processing returns to the calling routine (see FIG. 6) at 795.

Figure 8:
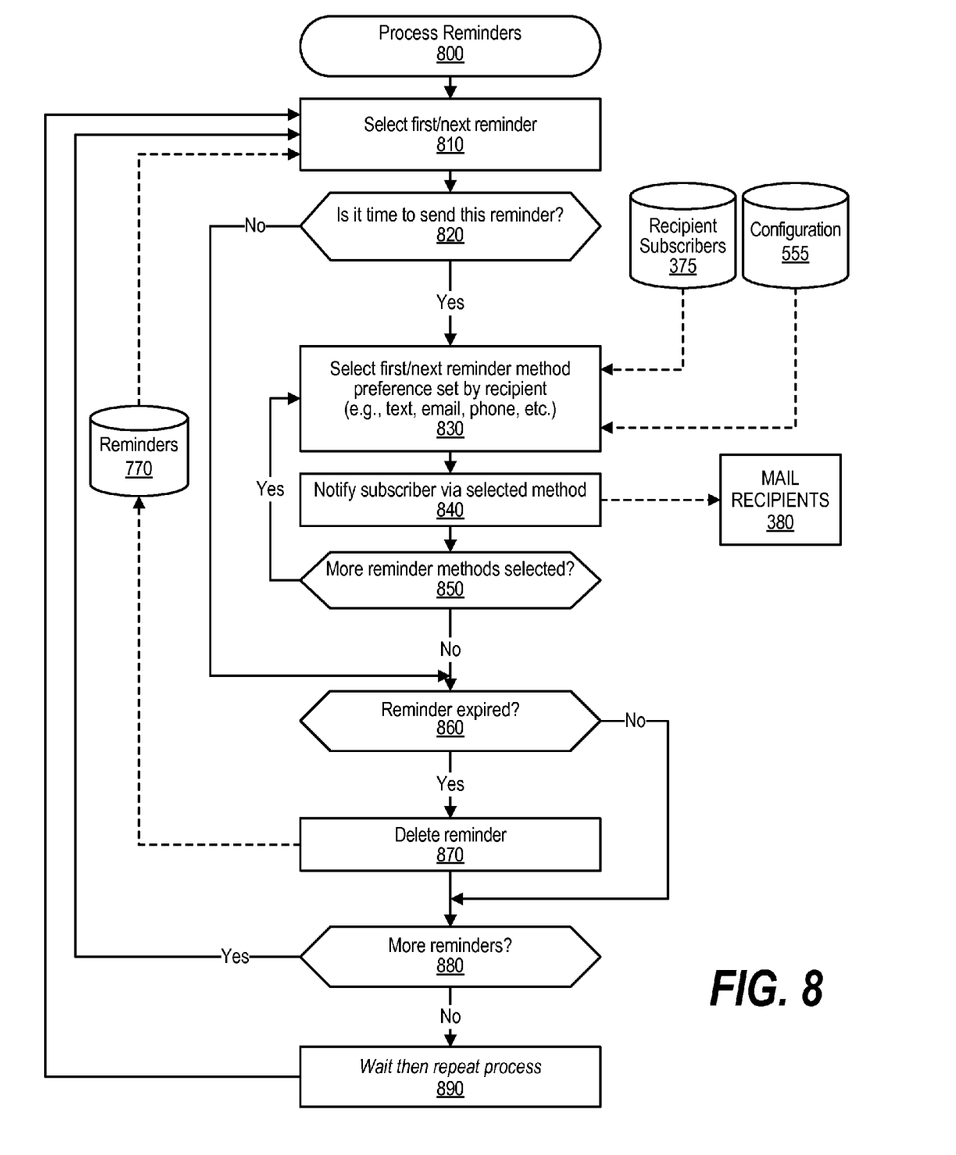
FIG. 8 is a flowchart showing steps performed to remind recipients regarding mail addressed to the recipients that included enhanced mail barcodes.

FIG. 8 is a flowchart showing steps performed to remind recipients regarding mail addressed to the recipients that included enhanced mail barcodes (eMBs). Processing commences at 800 whereupon, at step 810, the mail notification service reminder process selects the first reminder from data store 770. A determination is made as to whether it is the correct time to send the selected reminder to the recipient (decision 820). For example, the recipient may have requested that a reminder for an invoice be transmitted one week before the invoice was due. If the current date/time is ten days before the invoice due date, then the reminder would not be sent yet and decision 820 would branch to the "no" branch bypassing steps 830 through 850. On the other hand, if the current date/time is one week before the due date, or less, then decision 820 branches to the "yes" branch to process the reminder.

To transmit the reminder, at step 830, the process selects the first reminder method preference that was set by the recipient subscriber. The reminder method might indicate the electronic contact address (e.g., email address, mobile telephone number, etc.) to use as well as the type of reminder to be transmitted (e.g., email, text message, voice message, etc.). At step 840, the process transmits an electronic notification to the selected electronic contact address that corresponds to the addressee utilizing the message format preferred by the recipient (email, text message, voice, etc.). The electronic notification is transmitted to mail recipients 380 using the electronic contact address that corresponds to this recipient. A determination is made as to whether additional reminder methods have been selected by the recipient (decision 850). In this manner, for example, the recipient can request to receive both an email message at the recipients email account as well as a text message transmitted to the recipient's mobile telephone. If additional reminder methods have been selected, then decision 850 branches to the "yes" branch which loops back to select the next reminder method and transmit the reminder using the newly selected reminder method. This looping continues until there are no more reminder methods to use for the selected reminder, at which point decision 850 branches to the "no" branch for further processing.

After the reminder has been processed, a determination is made as to whether the selected reminder is expired (decision 860). For example, the reminder might be considered expired if the current date is somewhat after an invoice due date or is after a coupon expiration date. If the reminder is expired, then decision 860 branches to the "yes" branch whereupon, at step 870, the selected reminder is deleted from data store 770. On the other hand, if the reminder is not yet expired, then decision 860 branches to the "no" branch bypassing step 870.

A determination is made as to whether there are more reminders in data store 770 to process (decision 880). If there are more reminders to process, then decision 880 branches to the "yes" branch which loops back to step 810 to select and process the next reminder from data store 770 as described above. This looping continues until all of the reminders have been processed, at which point decision 880 branches to the "no" branch. At step 890, the process enters a wait state that waits for a period of time (e.g., until the next day, an hour, etc.) before looping back to re-perform the process starting with the first reminder in data store 770.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system that includes one or more processors and a memory, that notifies an addressee of postal mail, the method comprising:
    receiving a subscription request from a user corresponding to the addressee, wherein the subscription request includes one or more mail category selections and a notification preference pertaining to each of the selected mail categories;
    reading an enhanced mail barcode affixed to the postal mail, wherein the enhanced mail barcode identifies a contents of the postal mail and a mail type;
    comparing the mail type to the mail categories selected by the user, wherein the comparing results in a matching notification preference;
    retrieving an electronic contact address corresponding to the addressee of the postal mail, wherein the electronic contact address that is retrieved is based upon the matching notification preference; and
    transmitting an electronic notification to the retrieved electronic contact address that corresponds to the addressee.

2. The method of claim 1 wherein the electronic contact address is selected from the group consisting of an email address, a text message address, and a telephone number.

3. The method of claim 1 further comprising:
    wherein the subscription request includes the electronic contact address; and
    storing the electronic contact address in a nonvolatile data store.

4. The method of claim 3 further comprising:
    identifying a due date corresponding to the enhanced mail barcode affixed to the postal mail, wherein the electronic notification is a reminder of the identified due date.

5. The method of claim 4 further comprising:
    prior to reading the enhanced mail barcode, receiving, from the user, a reminder preference; and
    transmitting the electronic notification that is the reminder of the identified due date at a time based on the reminder preference.

6. The method of claim 5 further comprising:
    wherein the reminder preference is associated with at least one of the notification preferences.

7. An information handling system comprising:
    one or more processors;
    a memory coupled to at least one of the processors;
    a network adapter that connects the information handling system to a computer network;
    a set of instructions stored in the memory and executed by at least one of the processors in order to perform actions of:
    receiving a subscription request from a user corresponding to an addressee of postal mail, wherein the subscription request includes one or more mail category selections and a notification preference pertaining to each of the selected mail categories;

reading an enhanced mail barcode affixed to the postal mail, wherein the enhanced mail barcode identifies a contents of the postal mail and a mail type;

comparing the mail type to the mail categories selected by the user, wherein the comparing results in a matching notification preference;

retrieving an electronic contact address corresponding to the addressee of the postal mail, wherein the electronic contact address that is retrieved is based upon the matching notification preference; and transmitting an electronic notification to the retrieved electronic contact address that corresponds to the addressee.

8. The information handling system of claim 7 wherein the electronic contact address is selected from the group consisting of an email address, a text message address, and a telephone number.

9. The information handling system of claim 7 wherein the subscription request includes the electronic contact address and wherein the set of instructions perform further actions comprising:

storing the electronic contact address in a nonvolatile data store.

10. The information handling system of claim 9 wherein the set of instructions perform further actions comprising:

identifying a due date corresponding to the enhanced mail barcode affixed to the postal mail, wherein the electronic notification is a reminder of the identified due date.

11. The information handling system of claim 10 wherein the set of instructions perform further actions comprising:

prior to reading the enhanced mail barcode, receiving, from the user, a reminder preference; and transmitting the electronic notification that is the reminder of the identified due date at a time based on the reminder preference.

12. The information handling system of claim 11 wherein the reminder preference is associated with at least one of the notification preferences.

13. A computer program product stored in a computer readable medium, comprising computer instructions that, when executed by an information handling system, causes the information handling system to notify an addressee of postal mail by performing actions comprising:

receiving a subscription request from a user corresponding to the addressee, wherein the subscription request includes one or more mail category selections and a notification preference pertaining to each of the selected mail categories;

reading an enhanced mail barcode affixed to the postal mail, wherein the enhanced mail barcode identifies a contents of the postal mail and a mail type;

comparing the mail type to the mail categories selected by the user, wherein the comparing results in a matching notification preference;

retrieving an electronic contact address corresponding to the addressee of the postal mail, wherein the electronic contact address that is retrieved is based upon the matching notification preference; and transmitting an electronic notification to the retrieved electronic contact address that corresponds to the addressee.

14. The computer program product of claim 13 wherein the electronic contact address is selected from the group consisting of an email address, a text message address, and a telephone number.

15. The computer program product of claim 13 further comprising:

wherein the subscription request includes the electronic contact address; and storing the electronic contact address in a nonvolatile data store.

16. The computer program product of claim 15 further comprising:

identifying a due date corresponding to the enhanced mail barcode affixed to the postal mail, wherein the electronic notification is a reminder of the identified due date.

17. The computer program product of claim 16 further comprising:

prior to reading the enhanced mail barcode, receiving, from the user, a reminder preference wherein the reminder preference is associated with at least one of the notification preferences; and transmitting the electronic notification that is the reminder of the identified due date at a time based on the reminder preference.

* * * * *